United States Patent Office 3,824,240
Patented July 16, 1974

---

3,824,240
UNSYMMETRICALLY-SUBSTITUTED-s-TRIAZINES
Thirumurti L. Narayan, Riverview, Moses Cenker, Trenton, Peter T. Kan, Plymouth, and John T. Patton, Jr., Wyandotte, Mich., assignors to BASF Wyandotte Corporation, Wyandotte, Mich.
No Drawing. Filed Dec. 29, 1972, Ser. No. 319,930
Int. Cl. C07d 55/18
U.S. Cl. 260—249.5    5 Claims

ABSTRACT OF THE DISCLOSURE

Novel unsymmetrically-substituted triazines corresponding to the formula:

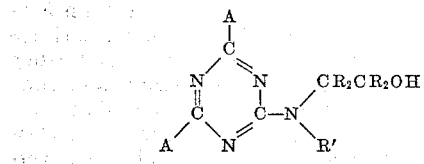

wherein R is hydrogen or lower alkyl, R' is lower alkyl or hydroxyalkyl, A is alkoxy, aryloxy, alkyl, aryl or —$NR_2''$ wherein R'' is lower alkyl. These compounds are useful as catalysts for preparing rigid cellular foams.

---

BACKGROUND OF THE INVENTION

1. Field Of The Invention

The present invention relates to new triazine compositions and in particular to unsymmetrically-substituted triazines possessing catalytic activity.

2. Prior Art

In U.S. Pat. No. 3,573,301 there is disclosed and claimed certain substituted triazine compounds for use as cross-linking agents in the manufacture of alkyds and polyesters, as well as intermediates in the preparation of urethane compounds. It has been found, however, that many of such compounds function, not as urethane intermediates, but as catalysts for the preparation of rigid cellular foams. Moreover, the reference patent discloses other related triazine compounds, allegedly designed to function similarly to the claimed compounds, but, again, many of such compounds are catalysts for the preparation of rigid foams characterized by carbodiimide linkages.

The present invention provides triazine compositions related to, but distinct from, those of the reference patent which also function as catalysts for the preparation of rigid cellular foams.

SUMMARY OF THE INVENTION

In accordance with the present invention there is provided novel catalysts for the preparation of rigid cellular foams. The catalysts correspond to the formula:

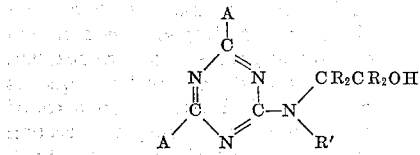

wherein R is hydrogen or lower alkyl, R' is lower alkyl or hydroxyalkyl, and A is alkoxy, aryloxy, alkyl, aryl or —$NR_2''$ wherein R'' is lower alkyl.

For a more comprehensive discussion of the present invention, reference is made to the following detailed description and examples thereof.

DESCRIPTION OF THE PREFERRED EMBODIMENT

The present invention, generally, provides new compositions of matter which are catalysts for the preparation of rigid cellular foams.

The compositions of matter of the present invention are unsymmetrically-substituted triazine compounds corresponding to the formula:

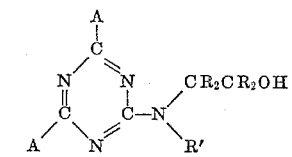

wherein R is hydrogen or lower alkyl of from 1 to 10 carbon atoms preferably 1 to 3 carbon atoms; R' is lower alkyl of from 1 to 12 carbon atoms, preferably 1 to 3 carbon atoms, or 2-hydroxyalkyl, the alkyl portion thereof having from 3 to 12 carbon atoms, preferably from 2 to 4 carbon atoms; and A is alkoxy of from 1 to 4 carbon atoms, aryloxy of from 6 to 12 carbon atoms, alkyl of from 1 to 4 carbon atoms, aryl of from 6 to 12 carbon atoms or —$NR_2''$ wherein R'' is lower alkyl of from about 1 to 5 carbon atoms, preferably 1 to 3 carbon atoms.

Representative of the class of triazine contemplated hereby is, for example:

2,4-dimethyl-6-(N-methyl-2-hydroxyethylamino)-1,3,5-triazine
2,4-diphenyl-6-di(2-hydroxypropylamino)-1,3,5-triazine
2,4-dimethoxy-6-(N-methyl-2-hydroxyethylamino)-1,3,5-triazine
2,4-dimethoxy-6-di(2-hydroxypropylamino)-1,3,5-triazine
2,4-diphenoxy-6-(N-methyl-2-hydroxyethylamino)-1,3,5-triazine
2,4-diphenoxy-6-(N-2-hydroxyethyl-N-2-hydroxypropylamino)-1,3,5-triazine
2,4-bis(dimethylamino)-6-(N-butyl-2hydroxyethylamino)-1,3,5-triazine
2,4-bis(dimethylamino)-6-di(2-hydroxypropylamino)-1,3,5-triazine
2,4-bis(diethylamino)-6-(N-methyl-2-hydroxyethylamino)-1,3,5-triazine
2,4-bis(diethylamino)-6-(N-ethyl-2-hydroxybutylamino)-1,3,5-triazine
2,4-bis(dibutylamino)-6-(N-methyl-2-hydroxyethylamino)-1,3,5-triazine and the like.

As noted, these unsymmetrically-substituted triazines are useful as catalysts for the preparation of rigid cellular foams as is more particularly pointed out in copending U.S. patent application Ser. No. 319,559, filed on even date herewith.

The unsymmetrically-substituted triazines of the present invention may be prepared by either of two procedures. The first procedure is well known to the skilled artisan. Generally, this procedure comprises reacting cyanuric chloride with an active hydrogen compound in a mole ratio equivalent to the number of chlorine atoms sought to be replaced. The resulting chlorotriazine is then separated from the reaction mixture and is then reacted with an amine or different chlorine replaceable product again in a mole ratio equivalent to the number of chlorine atoms sought to be replaced. Thus, for example, 2,4 - bis(dimethylamino) - 6 - (N - methyl - 2 - hydroxyethylamino)-1,3,5-triazine is prepared by reacting one mole of cyanuric chloride with two moles of dimethylamine to form 2,4 - bis(dimethylamino)-6-chloro-1,3,5-triazine. This product is then separated out from the reaction mixture and a separate reaction is initiated between the 2,4 - bis(dimethylamino) - 6 - chloro-1,3,5-triazine and N-methyl-2-hydroxyethylamine in a 1:1 mole ratio to prepare the 2,4-bis(dimethylamino)-6-(N-methyl-2-hydroxyethylamino)-1,3,5-triazine. For a more detailed description of this process, reference is made to U.S. Pat. No. 3,573,301 and D. W. Kaiser et al., *J. Am. Chem. Soc.*, 73, 2984 (1951).

The second process for preparing the unsymmetrical triazines is more particularly detailed in copending patent application Ser. No. 319,931, filed on even date herewith and incorporated herein by reference thereto. This process generally comprises the sequential reaction of all the substituents and eliminating the precursor or intermediate separation step.

As mentioned above, the unsymmetrically-substituted triazine compounds of the present invention have been found to be useful in the preparation of rigid cellular foams prepared by the catalytic condensation of an organic polyisocyanate. The preparation of such foams is well known in the art as evidenced by, inter alia, U.S. Pats. No. 3,657,161 and 3,645,923. Any of the polyisocyanates disclosed therein as well as the optional ingredients such as blowing agents, fillers, surfactants, polyols, etc., can be employed along with the unsymmetrically-substituted triazine catalysts of the present invention in the preparation of rigid cellular foams.

The following examples illustrate the invention. All parts are by weight unless otherwise indicated.

EXAMPLE I

A reaction vessel equipped with a reflux condenser, thermometer, additional funnel, and mechanical stirrer was charged with 600 parts of water and cooled to 0° C. Cyanuric chloride (184.5 parts) was then added portionwise maintaining the temperature of the reaction mixture below 5° C. Two moles (146.0 parts) of anhydrous diethylamine was then slowly added to the reaction mixture maintaining the temperature between 0° C.–5° C. Upon completion of the addition of the amine, a 50% aqueous potassium hydroxide solution (132 parts of KOH in 132 parts of water) was added to the charge over a period of 1.5 hours while maintaining the temperature below 50° C. After the addition was completed, the reaction mixture was maintained at 50° C. for two hours. One mole (75.0 parts) of N-methylethanolamine was then slowly added to the charge over a period of thirty minutes and the charge was heated to reflux temperature, about 100° C. After reaching reflux, 132 parts of a 50% aqueous solution of potassium hydroxide was added dropwise to the vessel over a period of about twenty minutes to neutralize the generated hydrochloric acid. The contents in the vessel were then refluxed for seventeen hours, after which time the reaction mixture was allowed to cool to room temperature. Thereafter, the organic layer was separated from the aqueous layer and was distilled to yield 251.1 parts of 2,4 - bis(diethylamino) - 6 - (N-methyl-2-hydroxyethylamino)-1,3,5-triazine, a liquid product having a boiling point of 153° C. at 0.45 mm. of mercury. A rigid cellular foam was prepared by heating an organic polyisocyanate and the above-identified triazine compound to an initiation temperature of between 110° C.–140° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N - dimethylaminopropyl)-s-hexahydrotriazine trimerization catalyst, a silicone surfactant and a plasticizer at or below or above ambient temperature conditions. Foams exhibiting excellent flame retardant properties were obtained.

EXAMPLE II

A reaction vessel equipped similarly to that used in Example I was charged with a slurry of 30.2 parts (0.15 mole) of 2-chloro-4,6-bis(dimethylamino)-1,3,5-triazine in 200 parts of water. With agitation 11.3 parts (0.15 mole) of N-methylethanolamine was added dropwise to the slurry while maintaining the temperature in the vessel at about 45° C. After the addition was completed, 12 parts of a 50% aqueous solution of sodium hydroxide was added to the vessel at a rate sufficient to maintain the pH at between seven and eight. After the sodium hydroxide addition was completed, the contents of the vessel was heated to reflux (101° C.) and maintained thereat for five hours. The reaction mixture was then allowed to cool to room temperature and 33.8 parts of white, crystalline 2,4-bis-(dimethylamino) - 6 - (N-methyl-2-hydroxyethylamino)-1,3,5-triazine precipitated. The product was collected by filtration, dried and recrystallized from petroleum ether. A rigid cellular foam was prepared by heating an organic polyisocyanate and the above-identified triazine compound to an initiation temperature of between 110° C.–140° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N-dimethylaminopropyl)-s-hexahydrotriazine trimerization catalyst, a silicone surfactant and a plasticizer at or below or above ambient temperature conditions. Foams exhibiting excellent flame retardant properties were obtained.

EXAMPLE III

To a reaction vessel equipped as in Example I and containing a slurry of 35.1 parts (0.2 mole) of 2-chloro-4,6-dimethoxy-1,3,5-triazine in 200 parts of water was added dropwise at room temperature, with stirring, 15 parts (0.2 mole) of N-methylethanolamine. After the amine was added, an aqueous solution of 21.2 parts (0.2 mole) of sodium carbonate in 60 parts of water was added over a period of one and one-fourth hours. The reaction mixture was then heated at 80° C. for three hours and, thereafter, allowed to cool to room temperature and 36.5 parts of crude crystalline 2,4-dimethoxy-6-(N-methyl-2-hydroxyethylamino)-1,3,5-triazine was recovered by filtration and drying. The crude product was then purified by recrystallization from a chloroform-petroleum ether mixture. A rigid cellular foam was prepared by heating an organic polyisocyanate and the above-identified triazine compound to an initiation temperature of between 110° C.–155° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N-dimethylaminopropyl)-s-hexahydrotriazine trimerization catalyst, a silicone surfactant and a palsticizer at or below or above ambient temperature conditions. Foams exhibiting excellent flame retardant properties were obtained.

EXAMPLE IV

At room temperature and into a reaction vessel equipped as in Example I was added a slurry of 29.9 parts (0.1 mole) of 2-chloro-4,6-diphenoxy-1,3,5-triazine in 150 parts of water. The slurry was then heated, with stirring, to 50° C. and 7.5 parts (0.1 mole) of N-methylethanolamine was added thereto dropwise over a ten-minute period. While continuing the stirring, the reaction mixture was heated to reflux (101° C.) and an aqueous solution of 4 parts of sodium hydroxide in 10 parts of water was added at a rate sufficient to keep the reaction mixture neutral. After the sodium hydroxide was added, the reaction mixture was refluxed for five hours. It was then cooled to room temperature and the solid, crystalline product was collected by filtration, washed with dilute sodium hydroxide, then with water and dried to a yield of 25 parts of 2,4-diphenoxy-6-(N-methyl-2-hydroxyethylamino)-1,3,5-triazine which was then recrystallized from benzene. A rigid cellular foam was prepared by heating an organic polyisocyanate and the above-identified triazine compound to an initiation temperature of between 110° C.–140° C. Examination of the infrared spectrum of the foam indicated the presence of carbodiimide, isocyanurate and isocyanate groups. Foams were also prepared by treating an organic polyisocyanate with the triazine compound along with a 1,3,5 - tris(N,N - dimethylaminopropyl)-s-hexahydrotriazine trimerization catalyst, a silicone surfactant and a plasticizer at or below or above ambient temperature conditions. Foams exhibiting excellent flame retardant properties were obtained.

EXAMPLE V

A reaction vessel equipped as in Example I was charged with 750 parts of water and cooled to 0° C. Cyanuric chloride (369 parts) was then added portionwise over a period of fifteen to twenty minutes maintaining the temperature of the reaction mixture below 5° C. Four moles (292.7 parts) of an aqueous solution (61.5%) of dimethylamine was then slowly added to the reaction mixture over a period of two hours maintaining the temperature between 0° C.–5° C. Upon completion of the addition of the amine, a 50% aqueous sodium hydroxide solution (160 parts of NaOH in 160 parts of water) was added to the charge over a period of one hour while the temperature rose to 50° C. After the addition was completed, the reaction mixture was maintained at 50° C. for another hour. One hundred fifty-eight parts of N-methylethanolamine was then added dropwise to the charge over a period of thirty minutes and the charge was heated to reflux temperature, about 105° C. After reaching reflux, 160 parts of a 50% aqueous solution of sodium hydroxide was added dropwise to the vessel over a period of about twenty minutes to neutralize the generated hydrochloric acid. The contents in the vessel were then refluxed for two hours, after which time the reaction mixture was allowed to cool to room temperature. Thereafter, the crystalline solid formed was collected by filtration, pulverized, washed with water and air dried. The yield of 2,4-bis(dimethylamino)-6-(N-methyl-2-hydroxyethylamino)-1,3,5-triazine was 419.5 parts (87.4% of theory) m.p. 104° C.–106° C. A rigid cellular foam was prepared by heating an organic polyisocyanate and the above-identified triazine compound to an initiation temperature of between 110° C.–140° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N - dimethylaminopropyl) - s - hexahydrotriazine trimerization catalyst, a silicone surfactant and a plasticizer at or below or above ambient temperature conditions. Foams exhibiting excellent flame retardant properties were obtained.

EXAMPLE VI

A reaction vessel equipped as described in Example I was charged with 55.4 parts of 2-chloro-4,6-bis(dibutylamino)-1,3,5-triazine, 12.0 part of N-methyl-2-hydroxyethylamine, 13.8 parts of sodium bicarbonate and 180 parts of xylene. The charge was heated to 112° C. and maintained at a temperature between 105° C.–113° C. for two and one-half hours. At that time, the reaction mixture was cooled and filtered to remove sodium chloride. The xylene was stripped from the filtrate and the residue, an oil, was vacuum distilled to give an 80% yield of 2,4-bis(dibutylamino)-6-(N - methyl-2-hydroxyethylamino)-1,3,5-triazine (boiling point of 181° C.–183° C. at 0.2 mercury). A rigid cellular foam was prepared by heating an organic polyisocyanate and the above-identified triazine compound to an initiation temperature of between 110° C.–140° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N-dimethylaminopropyl)-s-hexahydrotriazine trimerization catalyst, a silicone surfactant and a plasticizer at or below or above ambient temperature conditions. Foams exhibiting excellent flame retardant properties were obtained.

EXAMPLE VII

A reaction vessel equipped as described in Example I was charged with 140 parts (1.66 moles) of sodium bicarbonate in 460 parts of ethanol. Cyanuric chloride (96.2 parts) was then added portionwise maintaining the temperature of the reaction mixture between 20° C.–25° C. After the addition was completed, the reaction mixture was gradually, over a period of two hours, brought to reflux temperature and maintained there for two hours. Thereafter, 41.3 parts (0.55 mole) of N-methylethanolamine was added to the charge over a period of forty minutes. The contents in the vessel were then refluxed at 80° C. for six hours, after which time the reaction mixture was filtered hot to remove the inorganic material. The filtrate was concentrated and dried to yield a white crystalline solid. Analysis indicated a yield of 93 parts of 2,4-diethoxy-6-(N-methylethanolamino)-s-triazine, M.P. 106° C.–108° C. A rigid cellular foam was prepared by heating an organic polyisocyanate and the above-identified triazine compound to an initiation temperature of between 110° C.–140° C. Examination of the infrared spectrum of the foam indicated the presence of carbodiimide, isocyanurate and isocyanate groups. Foams were also prepared by treating an organic polyisocyanate with the triazine compound along with a 1,3,5-tris(N,N-dimethylaminopropyl)-s-hexahydrotriazine trimerization catalyst, a silicone surfactant and a plasticizer at or below or above ambient temperature conditions. Foams exhibiting excellent flame retardant properties were obtained.

The embodiments of the invention in which an exclusive property or privilege is claimed are defined as follows:

1. An unsymmetrically-substituted triazine corresponding to the formula:

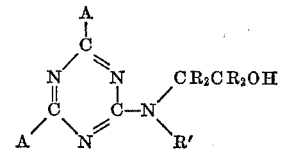

wherein R is hydrogen or lower alkyl having from 1 to 10 carbon atoms, R' is lower alkyl having from 1 to 12 carbon atoms or 2-hydroxyalkyl having from 3 to 12 carbon atoms and A is alkoxy, phenoxy, or —NR₂'' wherein R'' is lower alkyl having from 1 to 5 carbon atoms.

2. The triazine of claim 1 wherein R is hydrogen and R' is methyl.

3. The triazine of claim 2 wherein both A's are the same and are selected from the group consisting of methoxy, phenoxy, dimethylamino and diethylamino.

4. The triazine of claim 1 wherein R is hydrogen and R' is 2-hydroxyalkyl having from 3 to 12 carbon atoms.

5. The triazine of claim 4 wherein both A's are the same and are selected from the group consisting of methoxy, phenoxy, dimethylamino and diethylamino.

References Cited

UNITED STATES PATENTS 3,573,301    3/1971    Winter _____ 260—249.6

OTHER REFERENCES

Kaiser et al., J. Am. Chem. Soc., vol. 73, pp. 2984–6 (1951), QD 1.A5.

JOHN M. FORD, Primary Examiner

U.S. Cl. X.R.

260—249.6, 249.8, 2.5 AC